United States Patent [19]

Wulff

[11] Patent Number: 5,010,361
[45] Date of Patent: Apr. 23, 1991

[54] COPYING DEVICE FOR MODIFYING (DISTORTING) FILM PATTERNS

[76] Inventor: Michael Wulff, Grambeker Weg 161, D-2410 Mölln, Fed. Rep. of Germany

[21] Appl. No.: 447,222

[22] Filed: Dec. 7, 1989

[30] Foreign Application Priority Data

Dec. 7, 1988 [DE] Fed. Rep. of Germany ....... 3841100

[51] Int. Cl.⁵ ..................................... G03B 27/68
[52] U.S. Cl. ........................................ 355/52; 355/84
[58] Field of Search ................................ 355/52, 84

[56] References Cited

U.S. PATENT DOCUMENTS

| 3,445,165 | 5/1969 | Dubbs | 355/84 |
| 3,967,898 | 7/1976 | Klann | 355/52 X |
| 4,111,551 | 9/1978 | Klann | 355/84 |
| 4,390,272 | 6/1983 | Anderson | 355/52 |

FOREIGN PATENT DOCUMENTS 3516771 6/1987 Fed. Rep. of Germany.

Primary Examiner—L. T. Hix
Assistant Examiner—Khanh Dang
Attorney, Agent, or Firm—Toren, McGeady & Associates

[57] ABSTRACT

The device for the modification (distortion) of film patterns which are arranged on a film to be exposed, comprise a holder 15 for clamping in the pattern 19 for carrying out the relative movement over pattern 19 and film 20. A light source is movable on an exposure carriage 1 over pattern and film. Contact pressure rollers 4, 5 which roll on the pattern 19 are fastened at the exposure carriage. In order to design the clamping in a simple manner, the pattern is only clamped in on one side edge parallel to the movement direction of the exposure carriage of the holder 15. The movement of the holder 15 over the film to be exposed and accordingly also relative to the other movement, that of the exposure carriage 1, is transmitted through the coupling to the contact pressure rollers in order to prevent a film distortion by means of this relative movement. This coupling is effected by means of a toothed rack 14 which is fastened on the holder 15, a pinion 8 whose rotational movement is transmitted to the contact pressure rollers via a gear unit 7 engages in the toothed rack 14.

4 Claims, 3 Drawing Sheets

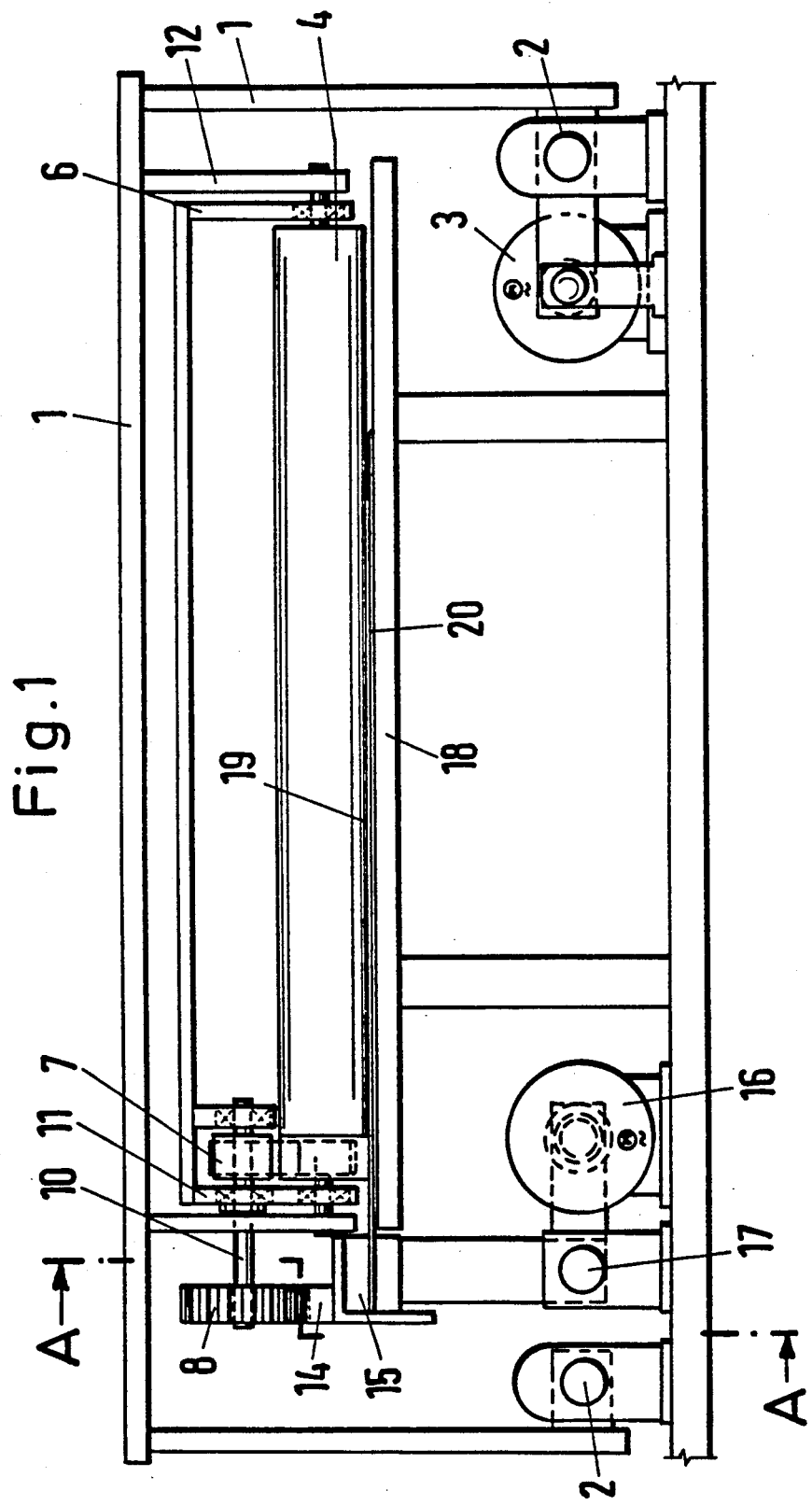

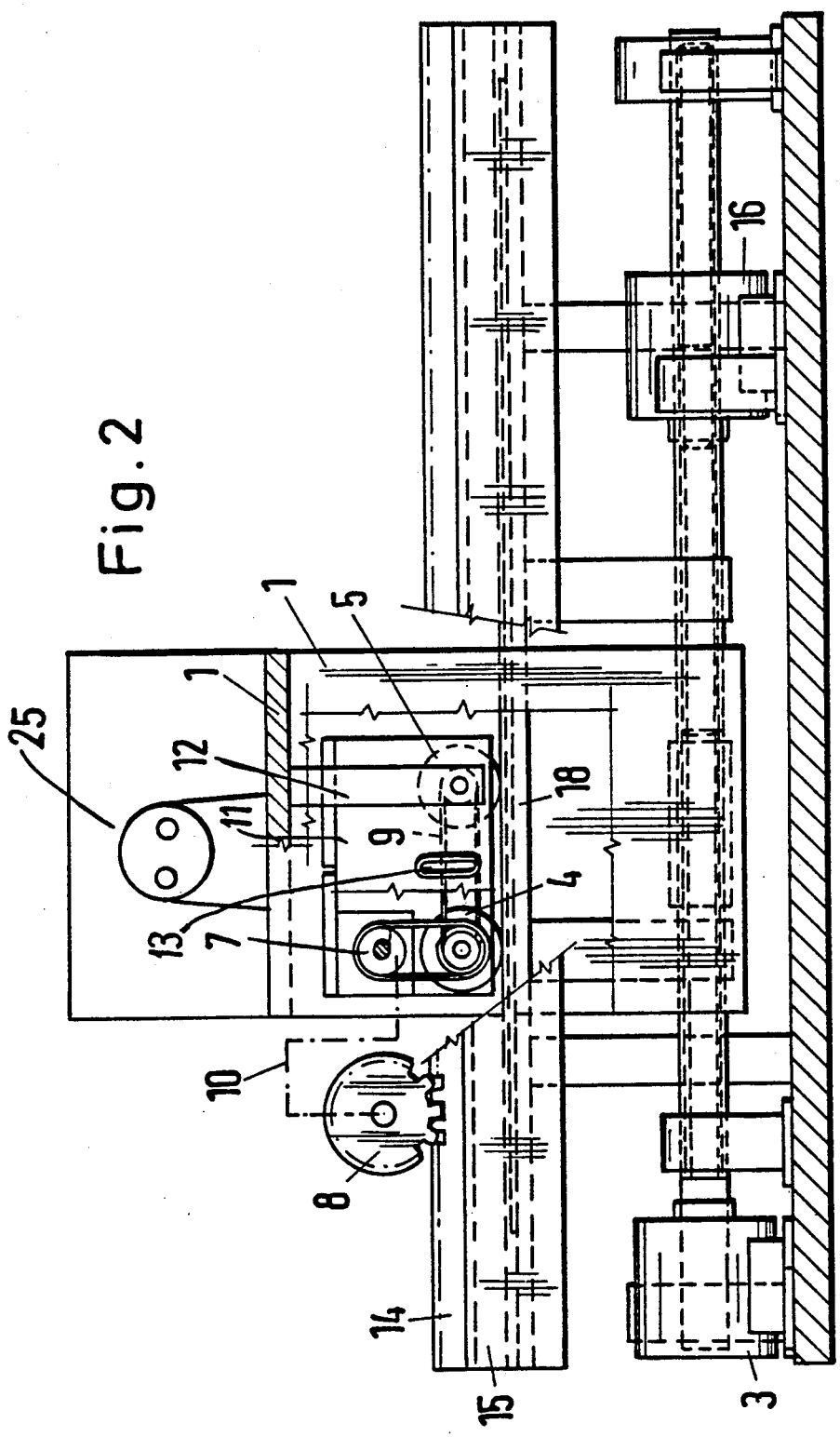

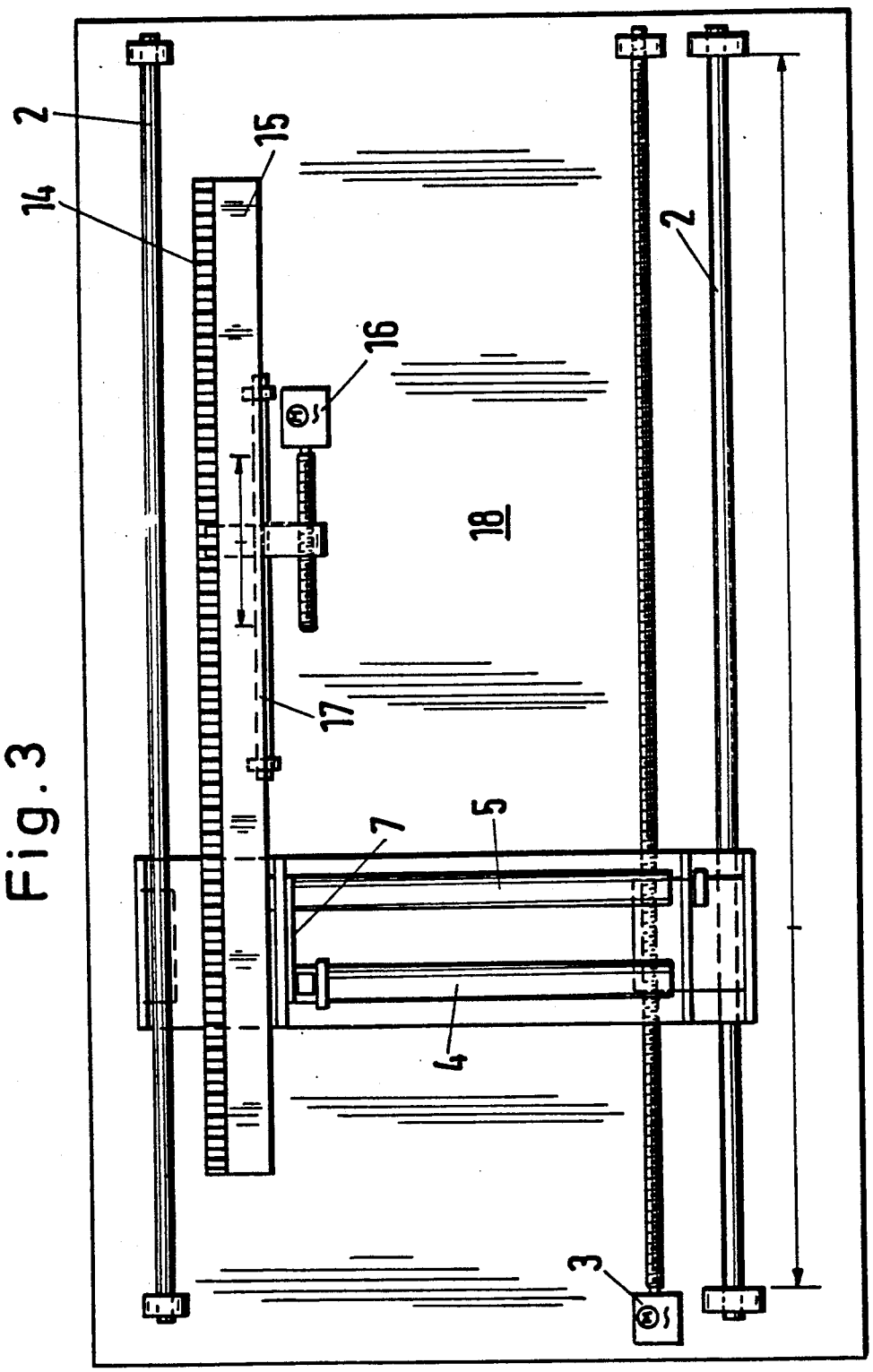

COPYING DEVICE FOR MODIFYING (DISTORTING) FILM PATTERNS

The invention is directed to a copying device according to the preamble of patent claim 1.

Such copying devices are used for the photomechanical modification of film patterns which are to be distorted, i.e. compressed or elongated, in the longitudinal direction and/or the transverse direction. For this purpose, the film pattern is arranged on the film to be exposed. The light source is moved over the film pattern and the film. The movement between the film and the film pattern is produced in known copying devices e.g. in that the film pattern is tightly clamped on at least two sides and is moved over the film in the axis in which the light source is moved. Another kind of movement in which the film pattern is stationary and the film is moved is also possible.

In a known device, the film pattern is fastened on a tensioning foil or sheet of glass under a frame which can be swiveled up. In so doing, a film distortion can come about very easily when fastening or exposing. This in turn has disadvantageous effects on the copying results. In addition, a sheet of glass or a plastics foil is located between the film pattern and the light source so that the quality of the exposure is decreased. Finally, the mechanical cost is relatively high.

The invention has the object of providing a copying device of the type mentioned in the beginning which is simply constructed and easy to operate and enables a fastening of the pattern film without distortion and prevents the exposure from being impaired through a troublesome medium. This object is met through the characterizing part of claim 1.

The pattern is clamped only on one side, according to the invention, so that the clamping can be achieved very simply and quickly. The holder provided by the clamping is moved in order to produce the movement between the pattern and the film. The contact pressure roller or rollers press the film pattern on the film. The light source, which is normally arranged on an exposure carriage together with the contact pressure rollers, is moved in the usual manner. Thus, two movements take place: that of the holder with the pattern and that of the light source carriage with the contact pressure rollers. A relative movement between the contact pressure rollers and the holder also takes place. This can lead to warping and can accordingly influence quality during copying. The invention prevents such warping in that the relative movement is compensated for by means of the positive coupling between the contact pressure rollers and the holder, i.e. the movement of the holder is transmitted to the contact pressure rollers.

Different constructions are conceivable for the constructional design of the coupling. An advantageous embodiment form is protected in claims 2 and 3. The contact pressure rollers roll through the coupling according to the invention at the correct speed regardless of the magnitude of the relative movement between the pattern and the film, i.e. neither forward nor backward movements are exerted on the pattern or film by the rollers.

The invention is explained in more detail in the following with reference to the drawing with the aid of an embodiment example.

FIG. 1 shows a side view of an embodiment form of a copying device according to the invention;

FIG. 2 shows a section according to line A—A of FIG. 1;

FIG. 3 shows a top view of the views of FIGS. 1 and 2.

The copying device shown in the drawing comprises a stationary frame on which an exposure carriage 1 is arranged so as to be movable in a reciprocating manner. The light source 25 and a line diaphragm, not shown, which can be a slit diaphragm or an optical diaphragm, a collecting lens, is located on the exposure carriage 1. These parts, which are not shown, are not of essential importance for the invention and are thus not described here in more detail.

In addition, two contact pressure rollers 4, 5 are fastened on the exposure carriage 1, which contact pressure rollers 4, 5 are fastened in a support 12 at the exposure carriage 1. The support is effected with the intermediary of a frame formed by two cheeks 6 and 11 which are securely connected with one another and form a frame which is open at the bottom, the contact pressure rollers 4 and 5 being supported in the frame. The exposure carriage is reciprocated by means of a drive motor 3 via a worm. Guides 2 provide for a parallel guidance.

A table 18 is provided on the frame, the film 20 to be exposed is arranged on the table 18, and the pattern 19 is arranged on the film 20. The film 20 is fastened on the table by means of glue or suction. The pattern 19 is clamped in a holder 15 at a side edge. The holder is moved by means of a drive motor 16 in order to generate the relative movement between the pattern 19 and the film 20. The drive motor transmits its drive movement via a spindle which runs parallel to a guide 17.

A toothed rack 14 is fastened on the holder 15 so as to extend in the movement direction. A pinion 8 engages in the toothed rack 14 and is connected with a belt pulley of a gear unit 7 via a shaft 10 (which is indicated in FIG. 2 as a dash-dot line for better clarity). The rotating movement of the belt pulley is transmitted via a belt to another belt pulley which is connected with the first contact pressure roller 4. This rotating movement is transmitted to the second contact pressure roller by means of a belt 9, so that the two contact pressure rollers 4 and 5 move synchronously.

A fastening is indicated at 10 in FIG. 2 for the line diaphragm.

When the light source, not shown, with the exposure carriage 1 and the line diaphragm is moved over the pattern and film by means of the drive motor 3 for carrying out the copying process, the pinion 8 rolls on the toothed rack 14. When the film pattern is moved relative to the film by means of the drive motor 16, the toothed rack 14 moves along with it so that this movement is transmitted to the two rollers 4 and 5 via the pinion 8, the shaft 10 and the gear unit 7 as well as the belt 8. A film distortion caused by the relative movement between the pattern and the film which could occur due to the simple one-sided clamping is prevented by means of this coupling, i.e. the corresponding drive of the contact pressure rollers, via the pinion 8. The device is very simple to operate, has a high exposure quality and low mechanical cost.

I claim:

1. A copying device for modification of a film pattern which is arranged on a film to be exposed, is moved relative to the film corresponding to a desired elongation or compression by means of moving a holder, and is exposed by a light source which is moved over the film pattern and film in an axial direction fixed by the relative movement between the film pattern and the film, wherein at least one contact pressure roller rolling in the pattern is moved along with its light source, the holder (15) being arranged only on one side so as to clamp an adjoining edge of the film pattern which extends parallel to the axial direction of the relative movement between the film pattern (19) and the film (20) and the movement of the light source (1), the at least one contact pressure roller (4, 5) being coupled with the holder (15) so as to move with said holder (15).

2. A copying device according to claim 1, wherein a toothed rack (14) is provided at the holder (15), a pinion (8), having a rotation transmitted to the at least one contact pressure roller (4, 5), being arranged so as to engage in the toothed rack (14).

3. A copying device according to claim 1 or 2, wherein the coupling is effected via a gear unit.

4. A copying device according to claim 3, wherein the gear unit includes a belt drive (7).

* * * * *